United States Patent
Naganawa

(10) Patent No.: US 10,410,607 B2
(45) Date of Patent: *Sep. 10, 2019

(54) INFORMATION DISPLAY APPARATUS THAT SUPERPOSES INFORMATION ON AN IMAGED IMAGE AND DISPLAYS THE INFORMATION AND THE IMAGED IMAGE, AND RELATED INFORMATION DISPLAY SYSTEM, CONTROL METHOD AND PROGRAM

(71) Applicant: CANON KABUSHIKI KAISHA, Tokyo (JP)

(72) Inventor: Yoshihiro Naganawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/630,510

(22) Filed: Jun. 22, 2017

(65) Prior Publication Data

US 2017/0287445 A1    Oct. 5, 2017

Related U.S. Application Data

(63) Continuation of application No. 14/140,832, filed on Dec. 26, 2013, now Pat. No. 9,721,538.

(30) Foreign Application Priority Data

Dec. 29, 2012   (JP) .................................. 2012-289183

(51) Int. Cl.
*G09G 5/377*    (2006.01)
*G06T 19/00*    (2011.01)
*G06T 7/246*    (2017.01)

(52) U.S. Cl.
CPC ............. *G09G 5/377* (2013.01); *G06T 7/246* (2017.01); *G06T 19/006* (2013.01); *G06T 2207/30204* (2013.01); *G09G 2320/106* (2013.01)

(58) Field of Classification Search
CPC ....... H04N 13/0468; H04N 2201/0081; H04N 5/145
See application file for complete search history.

(56) References Cited

U.S. PATENT DOCUMENTS 6,445,409 B1    9/2002   Ito et al.
7,148,913 B2 *  12/2006  Keaton .................. G06F 3/011
                                                 348/169

(Continued)

FOREIGN PATENT DOCUMENTS

JP    2011-242816 A    12/2011
JP    2012-058838 A    3/2012
WO    2010/029671 A1   3/2010

*Primary Examiner* — Samantha (Yuehan) Wang
(74) *Attorney, Agent, or Firm* — Venable LLP

(57) ABSTRACT

An information display apparatus includes at least one processor programmed to cause the apparatus, among other things, to superpose, on an imaged image, information related to an object when an object of one or more objects is in a target area, and not to superpose, on the imaged image, the information related to an object when the object of the one or more objects is outside of the target area. In a case in which a percentage of the one or more objects existing in the imaged image does not exceed a threshold value, the whole imaged image is determined to be the target area without using a detected movement direction, the one or more objects recognizable in the imaged image are recognized, and the information related to the recognized one or more objects in the imaged image is superposed on the imaged image.

19 Claims, 10 Drawing Sheets

(56) References Cited

U.S. PATENT DOCUMENTS

| | | | |
|---|---|---|---|
| 7,301,528 B2 * | 11/2007 | Marvit | G06F 1/1626 |
| | | | 345/156 |
| 8,963,954 B2 * | 2/2015 | Sandberg | H04W 4/21 |
| | | | 345/633 |
| 2007/0211161 A1 * | 9/2007 | Okamoto | H04N 5/232 |
| | | | 348/333.12 |
| 2010/0238262 A1 | 9/2010 | Kurtz et al. | |
| 2012/0056898 A1 | 3/2012 | Tsurumi et al. | |
| 2013/0127980 A1 * | 5/2013 | Haddick | G06F 3/013 |
| | | | 348/14.08 |
| 2014/0168056 A1 * | 6/2014 | Swaminathan | G06K 9/00604 |
| | | | 345/156 |

\* cited by examiner

401

401

401

401

INFORMATION DISPLAY APPARATUS THAT SUPERPOSES INFORMATION ON AN IMAGED IMAGE AND DISPLAYS THE INFORMATION AND THE IMAGED IMAGE, AND RELATED INFORMATION DISPLAY SYSTEM, CONTROL METHOD AND PROGRAM

This application is a continuation of U.S. patent application Ser. No. 14/140,832, filed Dec. 26, 2013, which claims the benefit of Japanese Patent Application No. 2012-289183, filed on Dec. 29, 2012, which is hereby incorporated by reference herein in its entirety.

BACKGROUND OF THE INVENTION

Field of the Invention

The present invention relates to an information display apparatus that superposes information on an image that has been captured by imaging (hereafter, this image will be called an imaged image) and displays the imaged image together with the superposed information, an information display system to which the information display apparatus is applied, a control method for the information display apparatus, and a program that is used to achieve the control method.

Description of the Related Art

Various kinds of techniques and systems that use augmented reality have been published (Japanese Patent Application Laid-Open No. 2011-242816, Japanese Patent Application Laid-Open No. 2012-058838). More specifically, Japanese Patent Application Laid-Open No. 2011-242816 describes that the display contents of augmented reality are changed according to an imaging direction and a user profile, and Japanese Patent Application Laid-Open No. 2012-058838 describes that, when numerous display targets of augmented reality exist in an input image, display priority is determined by performing weighting to the display targets in the imaged image.

In the techniques of the related art, described above, there are the following problems. That is, in such a mechanism as disclosed in Japanese Patent Application Laid-Open No. 2011-242816, if a plurality of augmented reality markers exist in a document that is in a certain direction, contents corresponding to all the pertinent markers are displayed, whereby a user is burdened with viewing of these markers.

Moreover, in such a mechanism as disclosed in Japanese Patent Application Laid-Open No. 2012-058838 corresponding to a plurality of markers, since markers are processed in the whole imaged area for the purpose of weight determination, the number of processes inevitably increases in proportion to an increase of the number of the markers. Consequently, for example, there are fears that a load to the mechanism, such as an apparatus or a system, becomes high, and that it takes a long time for the processes.

The present invention has been completed in order to solve the problems described above, and an object thereof is to provide an information display system capable of reducing a problem with respect to a display caused by display of content information corresponding to numerous markers and reducing process loads, and a control method for the information display system.

SUMMARY OF THE INVENTION

According to one aspect, the present invention provides an information display apparatus that superposes information on an imaged image and displays the information and the imaged image, the apparatus comprising a detection unit configured to detect a movement direction of an imaging target, a determination unit configured to determine a target area from the imaged image, based on the movement direction detected by the detection unit, a recognition unit configured to recognize an object in the imaged image, and a display control unit configured to superpose, on the imaged image, the information related to the object of the target area among the objects recognized by the recognition unit.

In another aspect, the present invention provides a control method for an information display apparatus that superposes information on an imaged image of a client apparatus and displays the information and the imaged image, the method comprising detecting a direction in which an in-imaging client apparatus is moved, determining a target area from the imaged image based on the detected direction, recognizing an object in the imaged image, and superposing, on the imaged image, the information related to the object of the target area among the recognized objects.

According to the present invention, it is possible, by displaying content information of an area on which a user keeps close watch through a user's natural operation, to reduce a problem with respect to a display caused by display of too much content information. Moreover, it is possible, by limiting the content information to be displayed, to reduce process loads.

Further features of the present invention will become apparent from the following description of exemplary embodiments with reference to the attached drawings.

DESCRIPTION OF THE EMBODIMENTS

Hereafter, preferred embodiments of the present invention will be described in detail with reference to the attached drawings. Incidentally, it should be noted that constitutions described in the following embodiments are merely examples, and thus, the present invention is not limited to the described and illustrated constitutions.

First Embodiment

As the first embodiment of the present invention, an example of an information display system in which an area on which a user keeps close watch is decided based on an operation (i.e., a movement of a client apparatus, a change of an imaging direction, or the like) of the user who is in imaging and an area (i.e., a target area) in which markers (objects) are detected is changed based on the decided result will be described hereafter.

Figure 1:
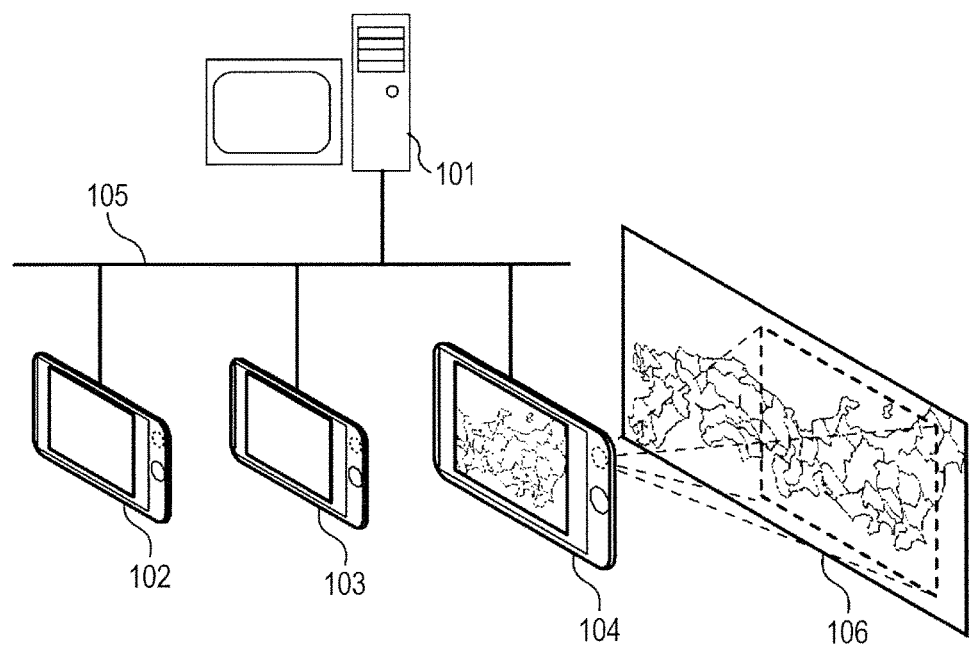
FIG. 1 is a diagram illustrating a network configuration of an information display system according to a first embodiment of the present invention.

FIG. 1 is a diagram illustrating an example of the network configuration of the information display system according to the present invention.

In the drawing, a server apparatus 101 manages and distributes a content corresponding to a marker (i.e., an object) that has been embedded in a document 106, such as a map, or the like. Each of client apparatuses 102 to 104, such as a mobile phone terminal, a personal digital assistant, or the like, detects (recognizes) a marker in an image that has been obtained by imaging, obtains the content corresponding to the detected marker from the server apparatus 101, and displays the obtained content. Here, it should be noted that the image that has been obtained by imaging is also called the imaged image, hereafter. For example, as the marker, it is possible to use a specific image, such as a two-dimensional bar code, or to use a specific image, or the like, that is detected in an infrared area or an ultraviolet area. Each of the client apparatuses 102 to 104 has a communication function therein, and is connected to a network 105. Incidentally, it is possible to have a configuration in which the content has been stored in the client apparatus 102 to 104 itself, and the stored content is displayed on the side of the client apparatus 102 to 104 in accordance with the marker detected in the imaged image. In such a case, since the content is not necessarily transmitted from the server apparatus 101, it is possible to have a configuration in which the server apparatus 101 is not provided.

Figure 2:
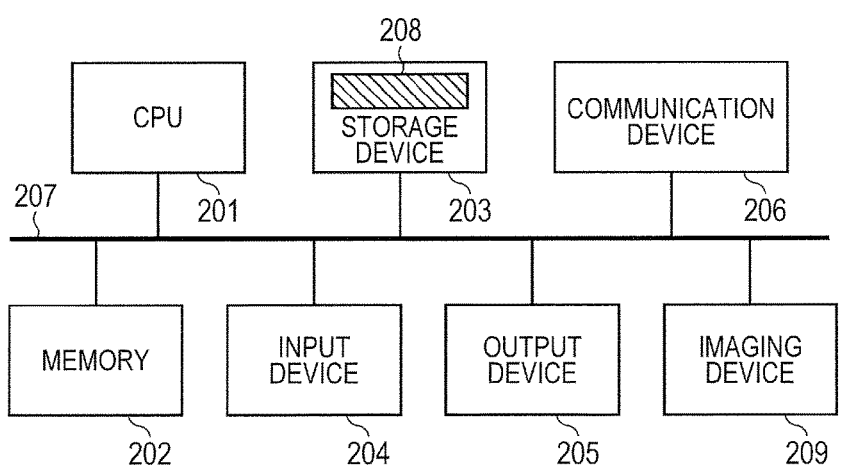
FIG. 2 is a diagram illustrating an internal constitution of a client apparatus according to the first embodiment.

FIG. 2 is a diagram illustrating an internal constitution of the client apparatus 102 according to the first embodiment. More specifically, the client apparatus 102 comprises a central processing unit (CPU) 201, a memory 202, a storage device 203, an input device 204, an output device 205, a communication device 206, and an imaging device 209 for imaging the document 106, and the like. Here, it should be noted that these units and devices are mutually connected to others through a bus 207.

The CPU 201 achieves later-described various functions by executing a program 208, and the like, stored in the storage device 203. The memory 202 temporarily stores therein the programs and the data read from the storage device 203 by the CPU 201. Moreover, the memory 202 is used as an area to be used for the CPU 201 to execute various programs. The storage device 203 stores therein an operating system (OS), various programs, control programs, various data, and the like. Here, the programs to be stored by the storage device 203 include a program for detecting the markers in the imaged image, a program for displaying the content after detecting the marker, a program for detecting acceleration, a movement direction, and the like, by a sensor, a program for processing detected data by an image processor, and the like. Incidentally, the storage device 203 is constituted by a mass-storage device such as a solid state device (SSD), a hard disk drive (HDD), or the like.

The input device 204 is a function unit that receives and accepts an input sent mainly from the user. For example, instructions for starting/stopping the imaging by the imaging device 209, the information of the acceleration, the movement direction, and the like, detected by moving the client apparatus, and the like, are input through the input device 204.

The output device 205 displays the information input by the input device 204, a result obtained by executing the program with the CPU 201, and the like.

The communication device 206 is the device that is used to connect the client apparatus to the network. In a case of detecting the marker and displaying the content corresponding to the marker, if the content exists in the server apparatus 101, the communication device transmits the marker information and receives the content information. In a case of displaying the content information without communicating with an external device, the communication device 206 is not necessarily provided.

The bus 207 is used to connect these devices to others for the purpose of data transfer.

The control programs 208 have been stored as partial data in the storage device 203.

The imaging device 209 images the document 106, and the like. Here, if the marker is the image that is detected (recognized) in the infrared area or the ultraviolet area as described above, the imaging device is constituted by a device that has sensitivity for such wavelength areas.

Figure 3:
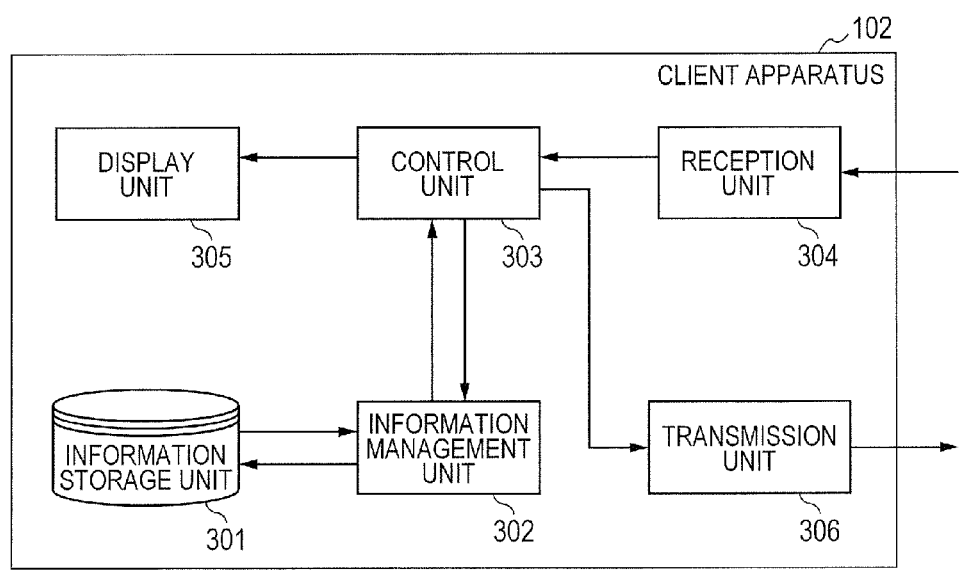
FIG. 3 is a function block diagram illustrating the client apparatus according to the first embodiment.

FIG. 3 is a function block diagram illustrating the client apparatus 102 according to the first embodiment. More specifically, the client apparatus 102 is constituted by function units including an information storage unit 301, an information management unit 302, a control unit (a recognition unit, a measurement unit, a change unit, a display processing unit) 303, a reception unit 304, a display unit 305, and a transmission unit 306.

The information storage unit 301 is the function unit that stores therein the content information to be displayed, the information obtained by the user's operation to the client apparatus 102, and the like, in response to instructions from the later-described information management unit 302. More specifically, on the premise that the CPU 201 executes the program 208, the information is stored and secured in the memory 202 and the storage device 203.

The information management unit 302 is the function unit that operates and manages the information to be stored in the information storage unit 301. In other words, the information management unit operates and manages the information storage unit 301, in response to requests sent from the later-described control unit 303. More specifically, the operation and the management by the information management unit are achieved on the premise that the CPU 201 executes the program 208.

The control unit 303 is the function unit that controls to perform the respective functions of the program 208 in response to the information received by the later-described reception unit 304. Incidentally, since the control unit 303 comprises an internal timer, it is possible for the control unit to obtain various times. Moreover, the control unit 303 detects whether or not the marker exists in the image obtained by the imaging of the imaging device 209, and stores the information related to the detected marker in the information storage unit 301.

The reception unit 304 is the function unit that receives the information directly input by the user or transmitted from the server apparatus 101, and notifies the received information to the control unit 303.

The display unit 305 is the function unit that displays the results obtained by performing the various functions with the control unit 303 based on the information input by the reception unit 304. More specifically, this unit is constituted by the output device 205.

The transmission unit 306 is the function unit that transmits the information of the information storage unit 301, and the like, outwardly, in response to an instruction, or the like, from the control unit 303.

Figure 4:
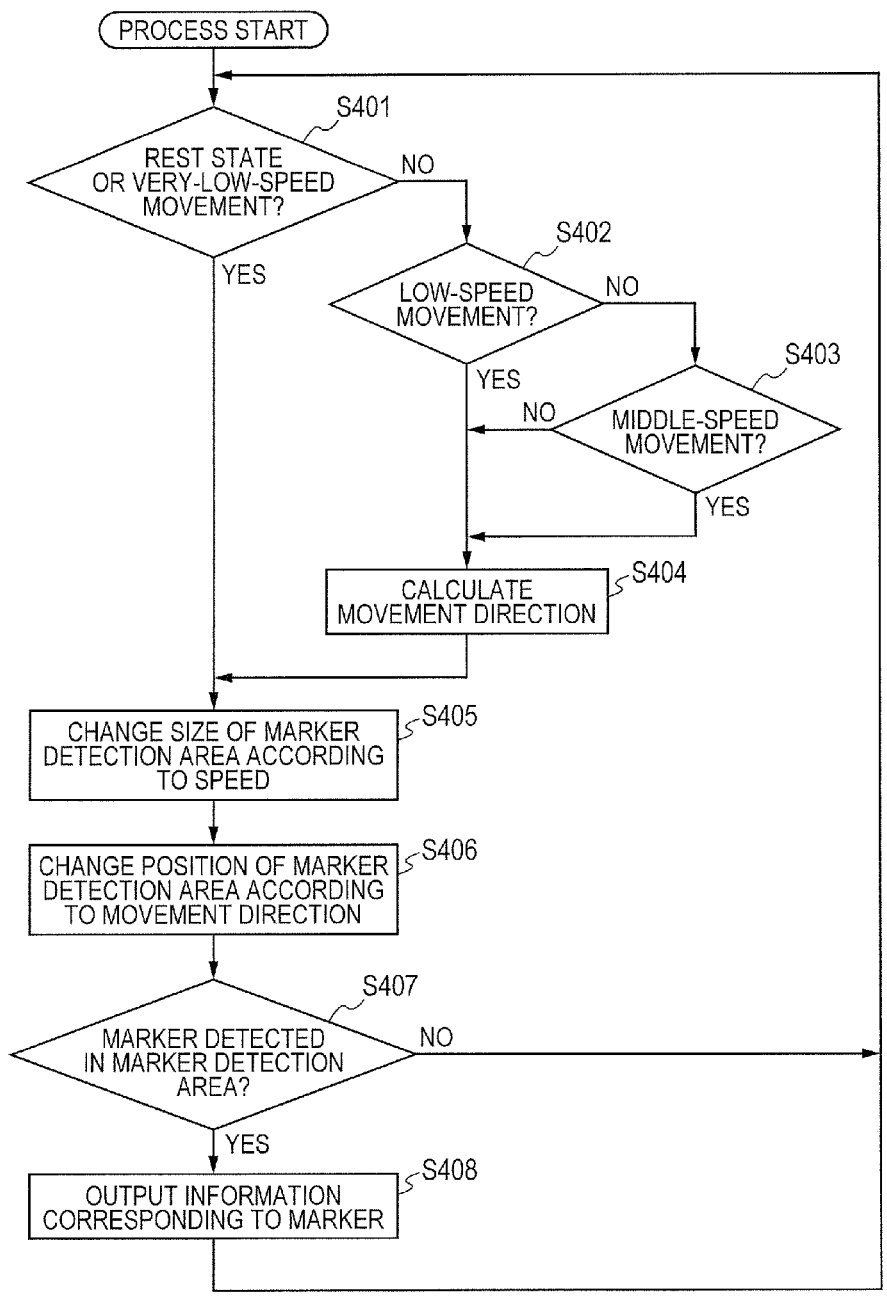
FIG. 4 is a flow chart for describing an operation of the client apparatus according to the first embodiment.

FIG. 4 is a flow chart for describing an operation of the client apparatus 102 in the electronic information display system according to the first embodiment. Here, the CPU 201 of the client apparatus 102 performs the process in the flow chart by executing the program 208 described above.

In a step S401, the control unit 303 measures the movement speed of the client apparatus 102, and decides based on the measured speed whether or not the client apparatus 102 is in a rest state or a very-low-speed movement state. More specifically, when the measured speed is equal to or less than a set threshold value (i.e., equal to or less than a first threshold value), it is decided by the control unit 303 that the client apparatus 102 is in the rest state or the very-low-speed movement state, and the process goes to a step S405. On the other hand, when the measured speed exceeds the first threshold value, the control unit 303 further measures the movement speed in steps S402 and S403. More specifically, in the step S402, the control unit 303 decides whether or not the measured and detected speed exceeds a second threshold value. When the measured and detected speed is equal to or less than the second threshold value, it is decided that the client apparatus 102 is in a low-speed movement state. On the other hand, when the measured and detected speed exceeds the second threshold value, then the control unit 303 further decides in the step S403 whether or not the measured and detected speed exceeds a third threshold value. When the measured and detected speed is equal to or less than the third threshold value, it is detected that the client apparatus 102 is in a middle-speed movement state. On the other hand, when the measured and detected speed exceeds the third threshold value, it is detected that the client apparatus is in a high-speed movement state. Then, the control unit 303 calculates the movement direction in a step S404.

Incidentally, in a case in which a sensor, such as a triaxial acceleration sensor, a gyro sensor, or the like, has been installed the client apparatus 102, it is possible in the step S401 to decide the movement speed and the movement direction on the basis of a detected output of the sensor. Alternatively, it is possible to calculate the movement speed and the movement direction through an image process to be performed to the image imaged by the imaging device 209. In any case, if it is constituted to decide the movement speed and the movement direction through the sensor, it is possible to increase the decision speed as compared with the case in which the decision is performed through the normal CPU process, and thus, it is possible to achieve a smart operation. On the other hand, if it is constituted to decide the movement speed and the movement direction through the image process, it is possible to omit the sensor from the products. Besides, since it is possible to apply the decision process described above even to the product to which any sensor cannot be installed additionally, it is possible to reduce costs.

In the steps S405 and S406, the size, the position and the shape of a marker detection area (i.e., a target area) in which the marker is detected are changed in accordance with the results detected in the steps S401 to S404.

Figure 5:
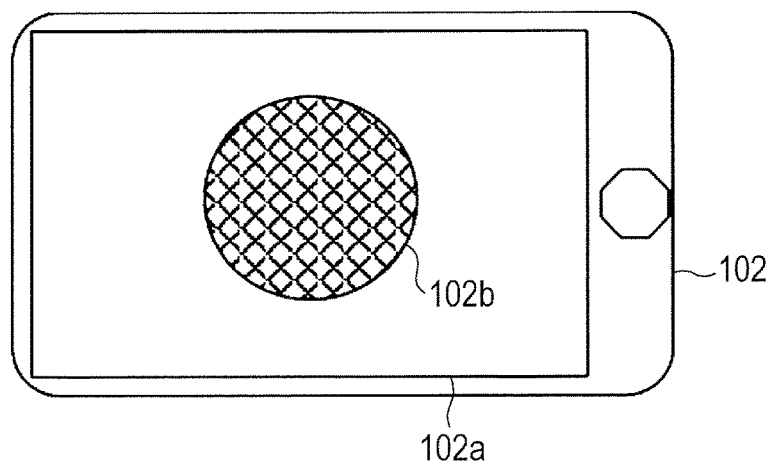
FIG. 5 is a diagram illustrating an example of a display section and a marker detection area of the client apparatus according to the first embodiment.

FIG. 5 is a diagram illustrating an example of the state that has been decided in the step S401 as the rest state or the very-low-speed movement state. In either one of these states, it is conceivable that the user keeps close watch on the center of a screen 102a of the client apparatus 102. Consequently, the control unit 303 considers a marker detection area (target area) 102b as a first area that is located near the center of the screen 102a of the client apparatus 102.

Incidentally, although the marker detection area (target area) 102b is circular in FIG. 5 for convenience of the description, this is merely an example. It should be noted that the marker detection area (target area) 102b is not necessarily circular. Namely, the marker detection area may be, e.g., rectangular.

Figure 6:
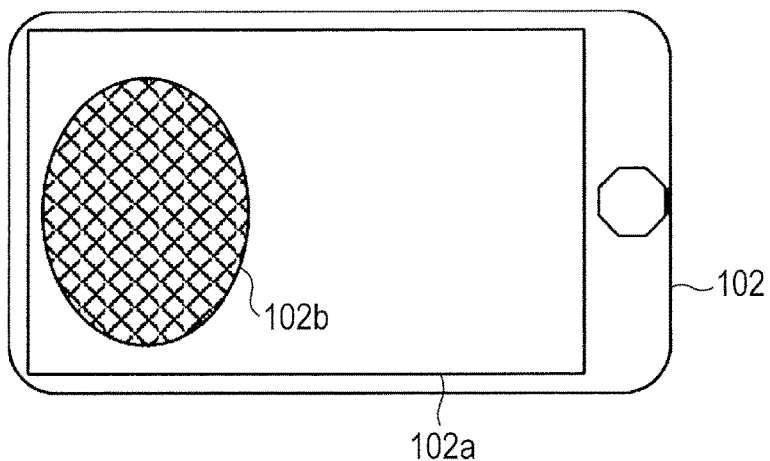
FIG. 6 is a diagram illustrating an example of the display section and the marker detection area of the client apparatus according to the first embodiment.

FIG. 6 is a diagram illustrating an example of the state that it has been decided in the step S402 that the client apparatus 102 is in the leftward low-speed movement state (e.g., less than 3 cm per second). In this state, it is conceivable that the user keeps close watch on the information displayed on the left of the screen 102a. Consequently, the control unit 303 considers the marker detection area (target area) 102b as an area (i.e., a second area) that is shifted to the left from the center of the screen 102a.

Here, it should be noted that the area that is shifted to the left indicates an area that includes information to be displayed on the left and information to be displayed on the right, and the amount of information to be displayed on the left is greater than the amount of information to be displayed on the right.

Figure 7:
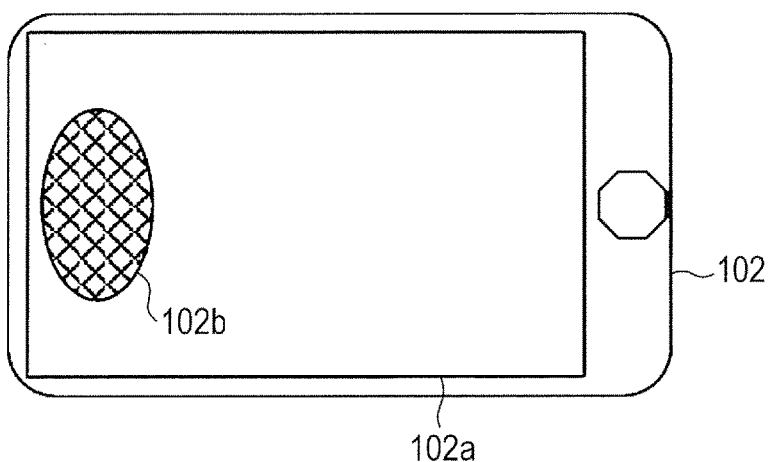
FIG. 7 is a diagram illustrating an example of the display section and the marker detection area of the client apparatus according to the first embodiment.

In each of FIG. 6 and FIG. 7, although the shifted marker detection area (target area) 102b is elliptical for convenience of the description, this is merely an example. Namely, it should be noted that the shifted marker detection area (target area) 102b is not necessarily elliptical.

Moreover, FIG. 7 is the diagram illustrating an example of the state in which it has been decided in the step S403 that the client apparatus 102 is in the leftward middle-speed movement state (e.g., less than 6 cm per second). In this state, it is conceivable that the area on the screen 102a on which the user keeps close watch is narrow. Consequently, the control unit 303 considers the marker detection area (target area) 102b as an area (i.e., a third area) that is narrower than that illustrated in FIG. 6. Here, it should be noted that the narrow area indicates an area in which any one or both of the vertical and horizontal areas are narrow.

Further, in the state in which it has been decided in the step S403 that the client apparatus is in the high-speed movement state (e.g., equal to or greater than 6 cm per second), the control unit 303 considers the marker detection area 102b as an area that is further narrower than that illustrated in FIG. 7. Besides, in the case of the high-speed movement state, it is also possible to consider that the user does not keep close watch on the screen 102a and thus, not to display any content information.

In a step S407, it is detected whether or not the marker exists in the marker detection area (target area) 102b in the image that has been imaged by the imaging device 209. When it is detected that the marker exists in the marker detection area, then, in a step S408, the content information corresponding or related to the detected marker is superposed on the imaged image, and the obtained image information is output and displayed on the screen 102a. After the output of the content information in this manner is completed, the control unit 303 returns the process to the initial step (S401), and the processes described above are repeated.

Thus, the size, the position, and the shape of the marker detection area in the imaged image are changed according to the movement speed and the movement direction of the client apparatus 102, the content information corresponding to the marker in the marker detection area is superposed on the imaged image, and the imaged image is displayed together with the superposed content information.

Figure 8:
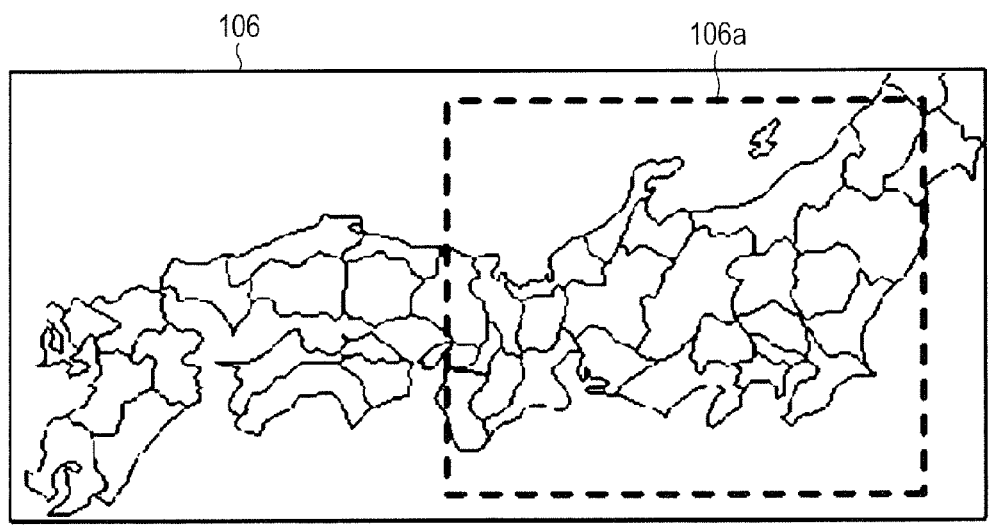
FIG. 8 is a diagram illustrating an example of a document (i.e., an example of a map) in which a marker has been embedded.

FIG. 8 is a diagram illustrating an example of a document in which a marker (object) has been embedded.

Figure 9:
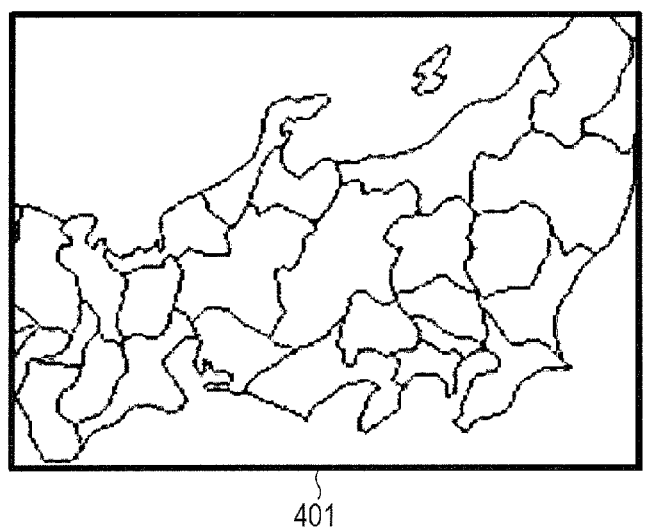
FIG. 9 is a diagram illustrating an example of an image that is obtained by imaging with the client apparatus the document in which the marker has been embedded.

FIG. 9 is a diagram illustrating an example of a document 401 that is displayed on the screen 102a when a part 106a of the document 106 is imaged by the client apparatus 102.

Figure 10:
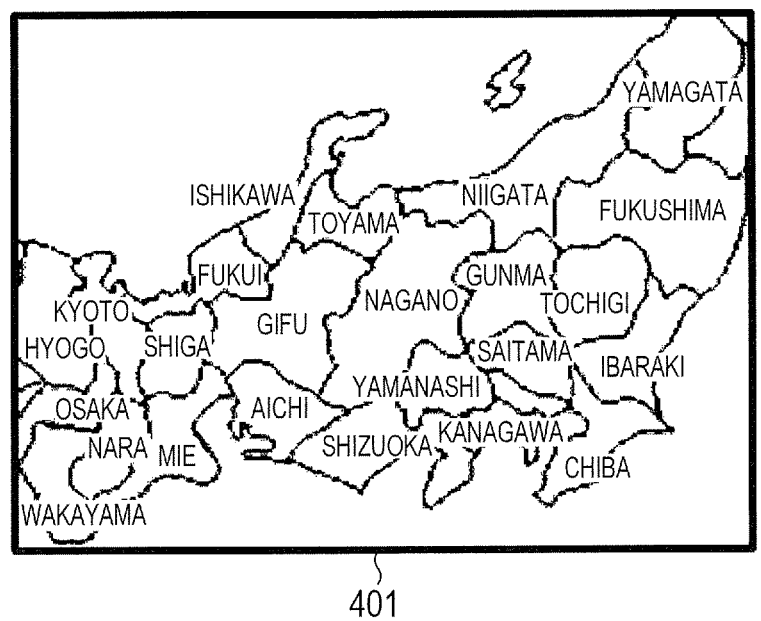
FIG. 10 is a diagram illustrating an example of a state in which whole content information corresponding to the markers is superposed on the image that is obtained by imaging with the client apparatus the document in which the markers have been embedded, and the image on which the content information has been superposed is displayed.

In a case in which the content information corresponding to all the markers in the imaged image is superposed and displayed, for example, as illustrated in FIG. 10, if numerous markers exist in an image, numerous content information (data) are superposed on the imaged image and displayed. Incidentally, FIG. 10 shows the case in which the contents corresponding to the markers are only the names of prefectures. Here, if the information related to the prefectures is included as the content information, since further numerous content information data are displayed, there is fear that the screen 102 of the client apparatus 102 is covered with the information.

Figure 11:
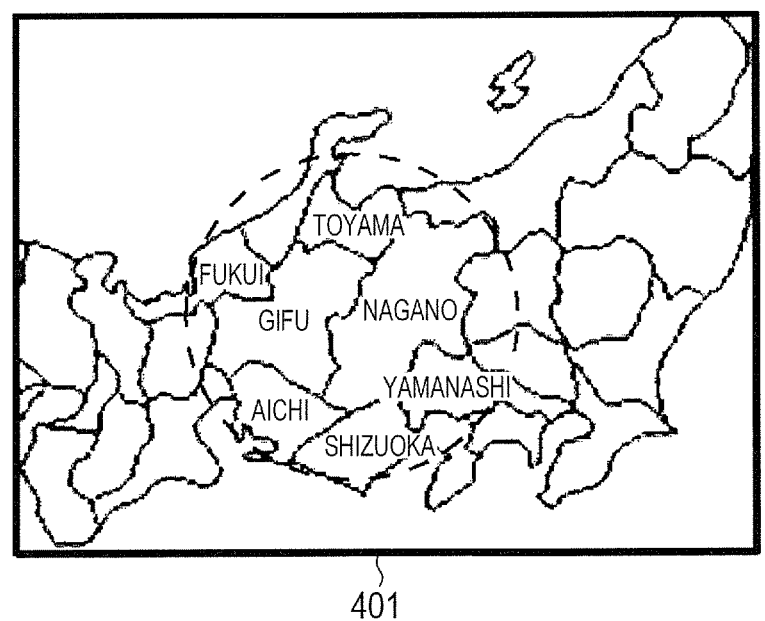
FIG. 11 is a diagram illustrating an example of a state in which the content information corresponding to the markers is superposed on the image that is obtained by imaging with the client apparatus of the first embodiment the document in which the markers have been embedded, and the image on which the content information has been superposed is displayed.
Figure 12:
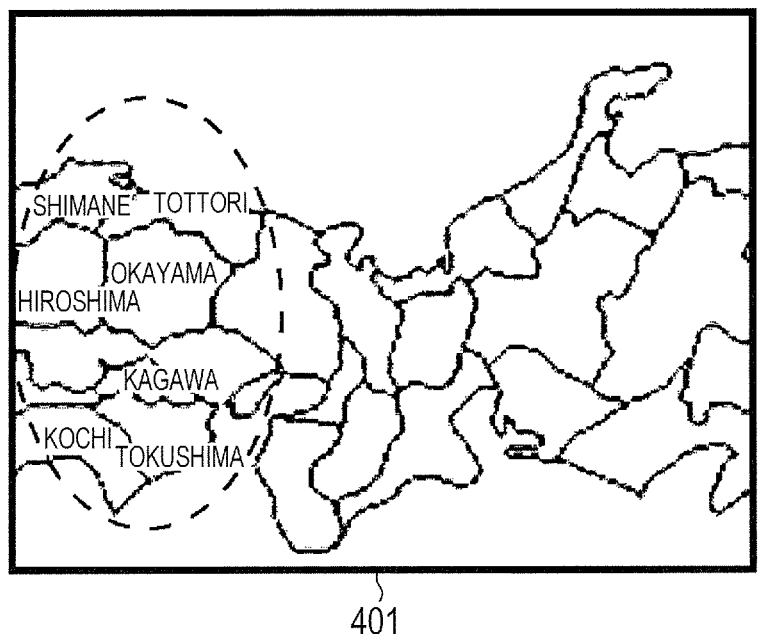
FIG. 12 is a diagram illustrating an example of a state in which the content information corresponding to the markers is superposed on the image that is obtained by imaging with the client apparatus of the first embodiment the document in which the markers have been embedded, and the image on which the content information has been superposed is displayed.
Figure 13:
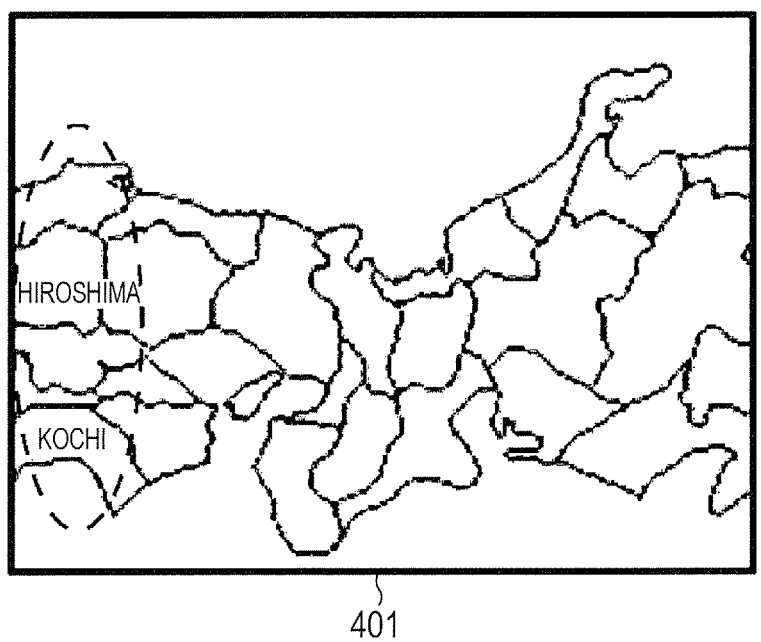
FIG. 13 is a diagram illustrating an example of a state in which the content information corresponding to the markers is superposed on the image that is obtained by imaging with the client apparatus of the first embodiment in the document in which the markers have been embedded, and the image on which the content information has been superposed is displayed.

On the other hand, each of FIGS. 11, 12 and 13 is a diagram illustrating an example of the document 401 that is displayed on the screen 102a when the process illustrated in the flow chart of FIG. 4 is performed.

More specifically, FIG. 11 illustrates the display example of the content information in the state in which the client apparatus 102 does not detect any movement.

FIG. 12 illustrates the display example of the content information in the state in which the client apparatus 102 is in the leftward low-speed movement state.

FIG. 13 illustrates the display example of the content information in the state in which the client apparatus 102 is in the leftward middle-speed movement state.

As illustrated in these drawings, in the information display system, the size, the position, and the shape of the marker detection area are changed according to the movement speed and the movement direction of the client apparatus 102, and the content information corresponding to the marker in the marker detection area is displayed. By this operation, it is possible to display the information that is appropriate for the user. For example, if the user moves the client apparatus 102 so that the desired position in the document is appropriately displayed on the screen 102a, the size, the position, and the shape of the marker detection area are changed according to such movement. When the user moves the client apparatus 102, he/she first moves the client apparatus 102 swiftly (e.g., in the middle-speed movement state) toward the target location in the document. Then, it is conceivable that the user reduces the movement speed (e.g., from the low-speed movement state to the stop state) as the client apparatus 102 approaches the target location. Consequently, when the client apparatus 102 is moved like this, the narrow marker detection area is first set at the position toward the movement direction. The greater the marker detection area near the center of the image is set, however, as the user reduces the movement speed.

As just described, in the client apparatus 102 according to the first embodiment, the area of the screen 102a on which the user presumably keeps close watch is set as the marker detection area in accordance with the movement state of the client apparatus 102. Thus, since the content information corresponding to the marker in the marker detection area of which the size, the position, and the shape are changed is superposed on the imaged image, and the imaged image is displayed together with the superposed content information, it is possible to properly control or to suppress the content information to be displayed. Consequently, it is possible to reduce a problem with respect to the display caused by display of numerous content information. Moreover, since the content information to be displayed is limited, it is possible to reduce the process loads of display.

Second Embodiment

In the first embodiment, the example in which the content information to be displayed is limited by changing the size, the position, and the shape of the marker detection area through the operation to be performed in the imaging has been described. On another front, in the second embodiment, an example in which display of the content information is changed by changing priority or importance of marker detection through an operation in an imaging action will be described. Incidentally, since the network configuration, the internal structure, and the function block diagrams for an information display system in the second embodiment are the same as those in the first embodiment, descriptions of these matters will be omitted.

Figure 14:
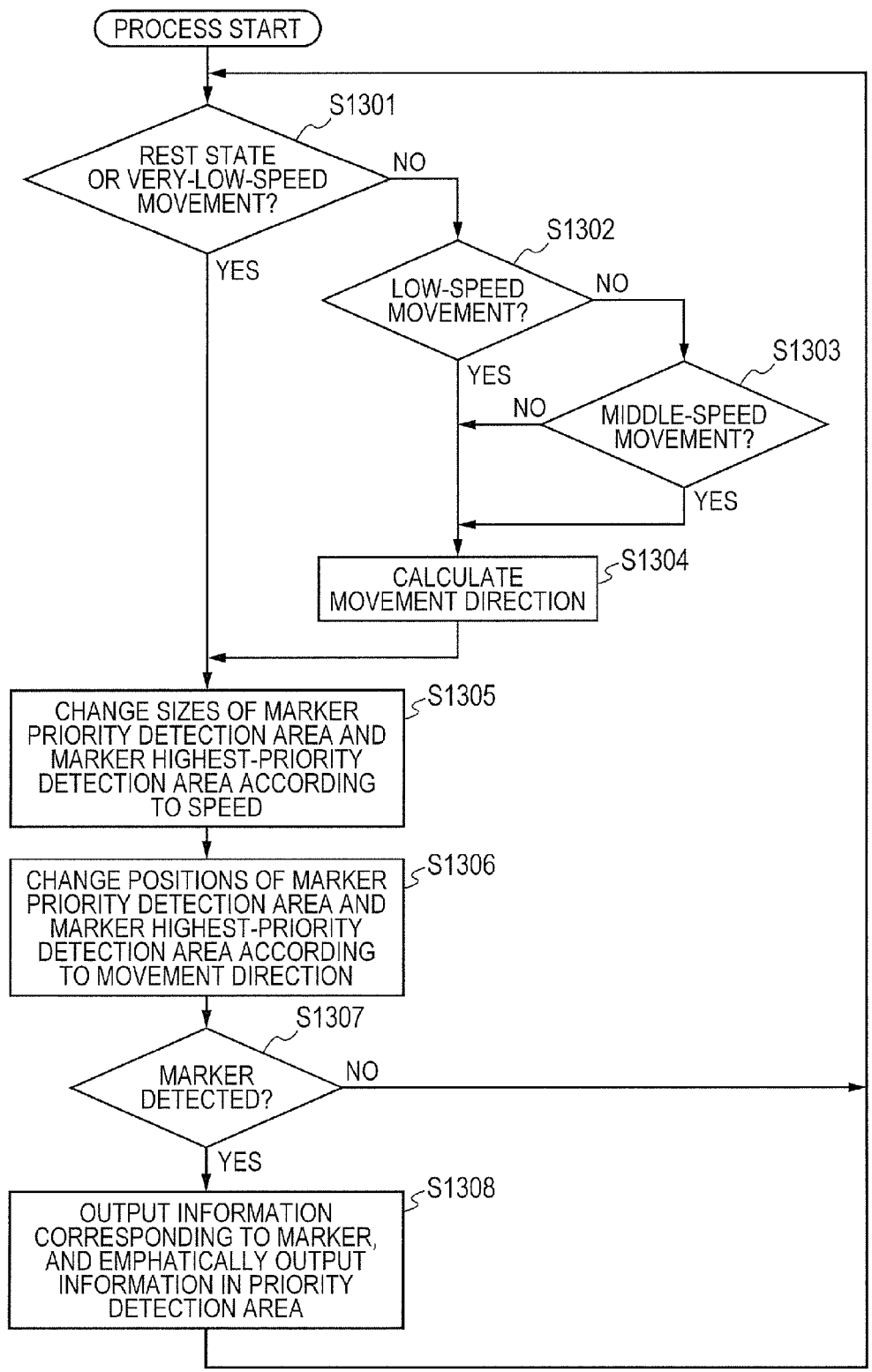
FIG. 14 is a flow chart for describing an operation of a client apparatus according to the second embodiment.

FIG. 14 is a flow chart for describing the operation of the client apparatus 102 in the information display system according to the second embodiment. Here, the process in the flow chart is achieved on the premise that the CPU 201 executes the control program 208. Incidentally, since the processes in steps S1301 to S1304 are the same as those in the steps S401 to S404 in FIG. 4 for deciding the movement state of the client apparatus 102, description of these processes will be omitted.

In steps S1305 and S1306, the marker detection area (i.e., the whole of the imaged image in the present embodiment) in which the marker is detected according to the movement state of the client apparatus 102 detected in the steps S1301 to S1304 is sectioned based on the importance, and a process of changing the size, the position, and the shape of the area (i.e., a marker priority detection area (a change area)) of which the importance is high is performed.

Figure 15:
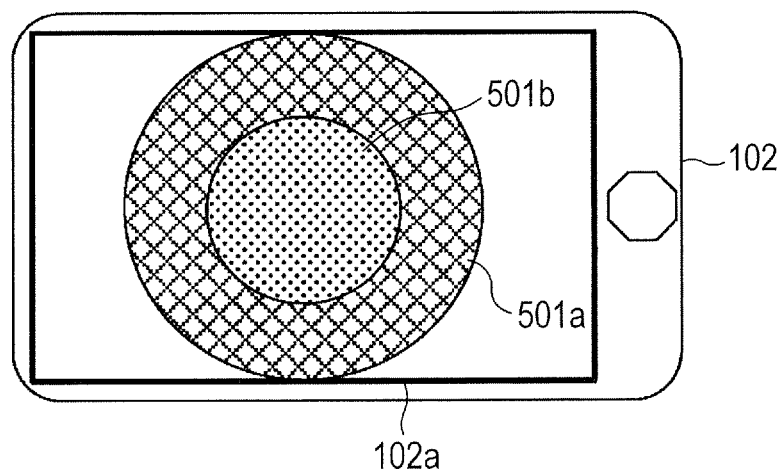
FIG. 15 is a diagram illustrating an example of a display section of the client apparatus according to the second embodiment and the importance of a marker detection area.

FIG. 15 is a diagram illustrating an example of the state that has been decided in the step S1301 as the rest state or the very-low-speed movement state. In either one of these states, although the marker detection area in which the marker is detected is set as the whole of the imaged image, it is conceivable that a user mainly keeps close watch on the center of the imaged image area. Consequently, the control unit 303 (i.e., a display processing unit, a display changing unit) handles the central portion of the image as a marker priority detection area 501*a* of which the importance is high, and further handles the center side (or the inner side) of the central portion of the image as a marker highest-priority detection area 501*b* of which the importance is higher.

Figure 16:
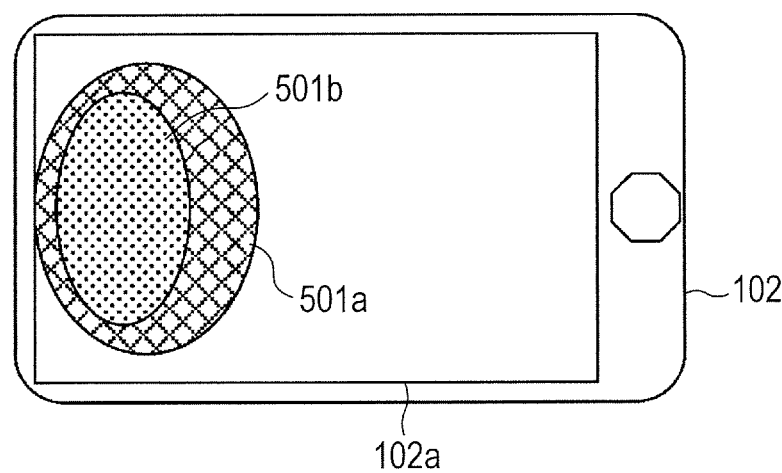
FIG. 16 is a diagram illustrating an example of the display section of the client apparatus according to the second embodiment and the importance of the marker detection area.

FIG. 16 is a diagram illustrating an example of the state in which the movement speed has been decided in the step S1302 as the low speed and the movement direction has been decided in the step S1304 as the left. In this case, it is conceivable that the user keeps close watch on the information displayed on the left of the screen 102*a* of the client apparatus 102. Consequently, the control unit 303 handles the marker priority detection area 501*a* and the marker highest-priority detection area 501*b* as the areas that have been shifted to the left of the center of the screen 102*a* and also handles these areas as the high-priority areas.

In a step S1307, it is decided whether or not the marker exists in the marker detection area (i.e., anywhere in the whole image displayed on the screen 102*a*).

In a step S1308, the content information corresponding to the detected marker is emphasized according to the priority or the importance, the emphasized content information is superposed on the imaged image, and they are output to the screen 102*a*. Incidentally, the priority or the importance is decided based on whether or not the detected marker exists in the marker priority detection area 501*a* or the marker highest-priority detection area 501*b*.

For example, the content information corresponding to the marker existing in the marker priority detection area 501*a* is output to the screen 102*a* in the size one point greater than the character size of the content information corresponding to the marker existing outside the marker priority detection area 501*a*. Moreover, the content information corresponding to the marker existing in the marker highest-priority detection area 501*b* is output to the screen 102*a* in the size two points greater than the character size of the content information corresponding to the marker existing outside the marker highest-priority detection area 501*b*.

After the output of the content information was completed as described above, the control unit 303 returns the process to the initial step (S1301), and the processes described above are repeated.

As just described, in accordance with the movement of the client apparatus 102, the content information corresponding to the markers existing in the marker priority detection area 501*a* and the marker highest-priority detection area 501*b* in the imaged image are emphasized and superposed on the imaged image, and the imaged image on which the emphasized content information has been superposed is displayed.

Figure 17:
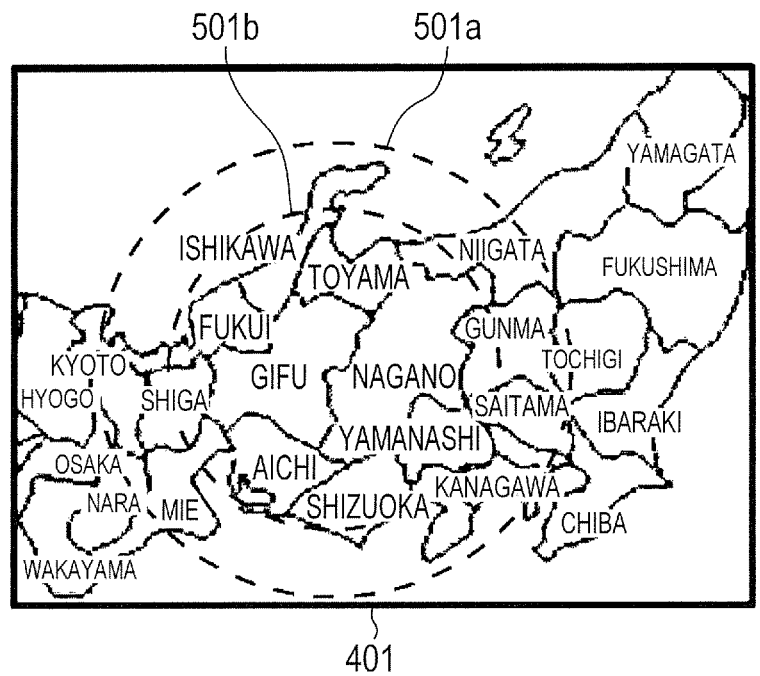
FIG. 17 is a diagram illustrating an example of a state in which the content information corresponding to the markers is superposed on the image that is obtained by imaging with the client apparatus of the second embodiment in the document in which the markers have been embedded, and the image on which the content information has been superposed is displayed.

FIG. 17 is a diagram illustrating an example of the document 401 to be displayed on the screen 102*a* at the time when the operation process indicated by the flow chart in FIG. 14 is performed. More specifically, FIG. 17 shows a display example of the content information in the state in which the client apparatus 102 does not detect any movement yet.

As illustrated in the drawing, the control unit 303 changes the display form of the content information such that the content information of the higher-importance area is displayed in larger size, whereas the content information of the lower-importance area is displayed in smaller size.

In this example, it is assumed that characters are displayed respectively in three different sizes of large, medium, and small sizes.

More specifically, the size of the character (e.g., "YAMAGATA") of the content information corresponding to the marker existing outside the marker priority detection area 501*a* is the small size.

Further, the size of the character (e.g., "SAITAMA") of the content information corresponding to the marker existing in the marker priority detection area 501*a* and outside the marker highest-priority detection area 501*b* is the medium size.

Furthermore, the size of the character (e.g., "NAGANO") of the content information corresponding to the marker existing in the marker highest-priority detection area 501*b* is the large size.

Incidentally, it should be noted that, as well as the change of the marker detection area in the first embodiment, the positions, the sizes, and the shapes of the marker priority detection area and the marker highest-priority detection area are changed according to the movement of the client apparatus 102.

In the case in which the user moves the client apparatus 102 such that the desired position in the document is displayed on the screen 102*a*, it is conceivable that he/she first moves the client apparatus swiftly toward a target location in the document, and then reduces the movement speed of the client apparatus 102 as the client apparatus 102 approaches the target location. In this case, the narrow areas on the side from which the movement direction extends are first set as the high-importance marker priority detection area 501*a* and the high-importance marker highest-priority detection area 501*b*. Then, as the movement speed is reduced, the areas closer to the center of the screen 102*a* are set as the high-importance marker priority detection area 501*a* and the high-importance marker highest-priority detection area 501*b*. By doing so, it is possible to clearly display the portion on which the user keeps close watch, and it is also possible to make portions other than the portion on which the user keeps close watch less noticeable while the relevant portions are being displayed. Consequently, it is possible to have an effect of not imposing a strain on the user.

Incidentally, although the marker detection area is sectioned based on the three kinds of priorities (i.e., the marker priority detection area 501*a*, the marker highest-priority detection area 501*b*, and other area) in the second embodiment, the number of priorities is not limited to this. Namely, it is possible to set any number of priorities if it is two or more. Moreover, it is possible to control or to suppress the information at the portion on which the user does not keep close watch, by changing the number of priorities according to a condition, such as the total number of markers existing in the imaged image, or the like.

Although the display size of the content information is changed according to the priority in the second embodiment, it is possible to change, instead of the display size, the display percentages of the content information according to the priority. For example, in the document illustrated in FIG. 17, the names of the prefectures and the information related to these prefectures that have been given as the content information are all displayed in the high-priority area, whereas, although the names of the prefectures and the information related to these prefectures have been given as the content information, only the names of the prefectures are displayed in the low-priority area. As just described, there is no problem if the method of displaying the whole or the part of the inherently given information according to the priority is adopted. Thus, since the area in which only the part of the display contents is handled exists, it is possible to reduce loads on the processing side in the system.

As described above, it is possible for the client apparatus 102 according to the second embodiment to identify the location on which the user keeps close watch by the imaging and browsing operations using the client apparatus 102. For this reason, it is possible to make the user to easily watch the displayed contents by properly changing the display form of the size of the content information, the details of the information, the amount of information, and the like, according to the location on which the user keeps close watch. Moreover, it is possible to reduce the process loads by properly changing the display form so as to reduce the details of the information or the amount of information.

Other Embodiments

It is possible to decide whether or not to perform the processes of the first and second embodiments in accordance with a density or a percentage of the markers and the content information included in the imaged area by the client apparatus 102. More specifically, in a case in which the percentage of the markers (i.e., the percentage of the objects) does not exceed a threshold value, there is no need to perform the processes of the first and second embodiments. Here, it should be noted that the percentage of the objects is calculated by, e.g., the following equation.

> The percentage of the objects=(the number of the objects included in the imaged area)/(the number of the objects predetermined based on the size of the screen 102a).

Figure 18:
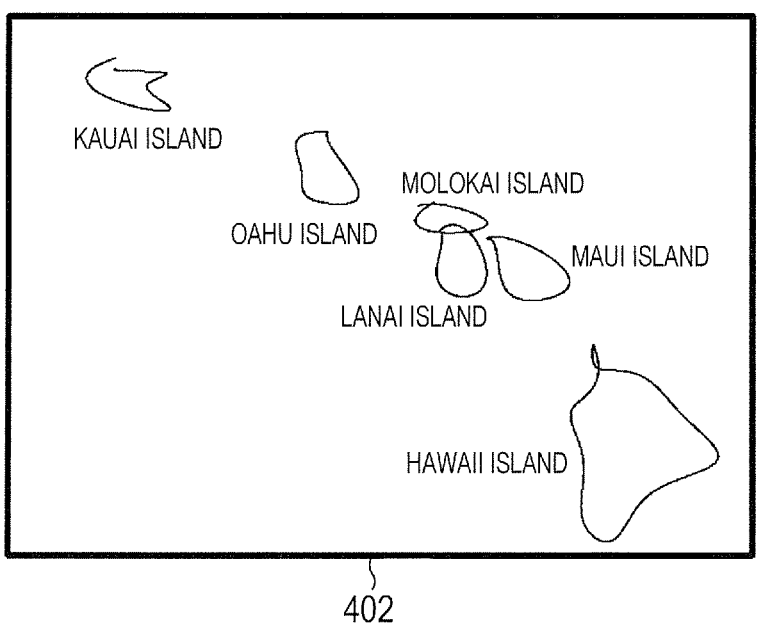
FIG. 18 is a diagram illustrating an example of a state in which a document in which markers have been embedded is imaged by a client apparatus according to another embodiment.

For example, FIG. 18 is a diagram illustrating a state in which a document 402 in which the density of markers is low has been imaged.

Like this, in the case in which the density of the markers is low, it is conceivable that the display of the whole content information is not cumbersome. Consequently, in this case, the number of the markers existing in the imaged image is detected, and the marker detection area is set according to the detected number of the markers, before the process of the flow chart illustrated in FIG. 4 or FIG. 14 is performed. More specifically, the client apparatus first detects the number of all the markers in the imaged image obtained by the imaging device 209. Then, if the detected number of the markers is less than a predetermined threshold value (e.g., about 5 to 20), a process of superposing the content information corresponding to all the markers existing in the imaged image on the imaged image and displaying the imaged image together with the superposed content information is performed instead of the process of the flow chart illustrated in FIG. 4 or FIG. 14.

In a case in which the process that is the same as that to be performed when the number of the markers is large is performed when the density of the markers is low, there is a possibility that the process load is increased as compared with the normal display process. It is possible, however, to performing such an operation as described above to suppress or to control an increase of the load. Also, from the viewpoint of the user, the display of the whole content information is not cumbersome because the density of the markers is low. Therefore, it is possible for the user to glance over the content information with less load.

As described above, the embodiments of the present invention have been described in detail. Moreover, the present invention can be carried out as, e.g., a system, an apparatus, a method, a program, a recording medium (a storage medium), or the like. More specifically, the present invention can be applied to a system that consists of a plurality of devices (e.g., a host computer, an interface device, an imaging device, a Web application, and the like), or to an apparatus that comprises a single device.

The embodiments of the present invention can also be realized by a computer of a system or an apparatus that reads out and executes computer executable instructions recorded on a storage medium (e.g., a non-transitory computer-readable storage medium) to perform the functions of one or more of the above-described embodiments of the present invention, and by a method performed by the computer of the system or the apparatus by, for example, reading out and executing the computer executable instructions from the storage medium to perform the functions of one or more of the above-described embodiments. The computer may comprise one or more of a central processing unit (CPU), a micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information display apparatus that superposes information on an imaged image and displays the information and the imaged image, the apparatus comprising:
  at least one processor programmed to cause the apparatus:
   (a) to detect, with a sensor, a movement direction of the imaged image relative to an imaging target;
   (b) to determine a location of a portion of a target area within the imaged image, based on the detected movement direction, the location of the portion of the target area being shifted within the imaged image based on the detected movement direction;
   (c) to recognize an object of one or more objects in the imaged image; and (d) to superpose, on the imaged image, information related to an object when the object of the one or more objects is in the target area, and not to superpose, on the imaged image, the information related to an object when the object of the one or more objects is outside of the target area, wherein, in a case in which a percentage of the one or more objects existing in the imaged image does not exceed a threshold value:
(i) the whole imaged image is determined to be the target area without using the detected movement direction;
(ii) the one or more objects recognizable in the imaged image are recognized; and
(iii) the information related to the recognized one or more objects in the imaged image is superposed on the imaged image.

2. The information display apparatus according to claim 1, wherein the at least one processor is further programmed to cause the apparatus (e) to detect a speed of movement of the imaged image, and, in a case in which the detected speed is equal to or less than a first threshold value, the location of the portion of the target area is determined to be a first area that is located near a center of the imaged image, and, in a case in which the detected speed exceeds the first threshold value, the location of the portion of the target area is determined to be a second area that is shifted within the imaging target in the detected movement direction.

3. The information display apparatus according to claim 2, wherein, in a case in which the detected speed exceeds a second threshold value that is greater than the first threshold value, the portion of the target area is determined to be a third area that is narrower than the second area.

4. The information display apparatus according to claim 1, wherein the object in the imaged image existing in the portion of the target area at a changed position within the imaged image is recognized.

5. An information display apparatus that superposes information on an imaged image and displays the information and the imaged image, the apparatus comprising:
at least one processor programmed to cause the apparatus:
(a) to detect, with a sensor, a movement direction of the imaged image relative to an imaging target;
(b) to determine a location of a portion of a target area within the imaged image, based on the detected movement direction, the location of the portion of the target area being shifted within the imaged image based on the detected movement direction;
(c) to recognize an object of one or more objects in the imaged image;
(d) to preferentially superpose, in a case in which a number of the one or more objects existing in the imaged image exceeds a threshold value, information related to the object being in the target area on the imaged image, and to suppress superposition of the information related to the object being outside of the target area on the imaged image; and
(e) to determine, in a case in which the number of the one or more objects existing in the imaged image does not exceed the threshold value, the whole imaged image to be the target area without using the detected movement direction, and to superpose the information related to the object recognizable in the whole imaged image on the imaged image.

6. The information display apparatus according to claim 5, wherein the at least one processor is further programmed to cause the apparatus (f) to detect a speed of movement of the imaged image, and, in a case in which the detected speed is equal to or less than a first threshold value, the location of the portion of the target area is determined to be a first area that is located near a center of the imaged image, and, in a case in which the detected speed exceeds the first threshold value, the location of the portion of the target area is determined to be a second area that is shifted within the imaging target in the detected movement direction.

7. The information display apparatus according to claim 6, wherein, in a case in which the detected speed exceeds a second threshold value that is greater than the first threshold value, the portion of the target area is determined to be a third area that is narrower than the second area.

8. The information display apparatus according to claim 5, wherein the object in the imaged image existing in the portion of the target area at a changed position within the imaged image is recognized.

9. An information display apparatus that superposes information on an image and displays the information and the imaged image, the apparatus comprising:
at least one processor programmed to cause the apparatus:
(a) to detect a movement direction of the image relative to a target;
(b) to determine a location of a portion of a target area within the image, based on the detected movement direction, the location of the portion of the target area being shifted within the image in the detected movement direction;
(c) to recognize an object of one or more objects in the image;
(d) to preferentially superpose, in a case in which the number of the one or more objects existing in the image exceeds a threshold value, information related to the object being in the target area on the imaged image, and to suppress superposition of the information related to the object being outside of the target area on the image; and
(e) to determine, in a case in which the number of the one or more objects existing in the image does not exceed the threshold value, the whole image to be the target area without using the detected movement direction, and to superpose the information related to the object recognizable in the whole image on the image.

10. The information display apparatus according to claim 9, wherein the at least one processor is further programmed to cause the apparatus (f) to detect a speed of movement of the image, and, in a case in which the detected speed is equal to or less than a first threshold value, the location of the portion of the target area is determined to be a first area that is located near a center of the imaged image, and, in a case in which the detected speed exceeds the first threshold value, the location of the portion of the target area is determined to be a second area that is shifted within the imaging target in the detected movement direction.

11. The information display apparatus according to claim 10, wherein, in a case in which the detected speed exceeds a second threshold value that is greater than the first threshold value, the portion of the target area is determined to be a third area that is narrower than the second area.

12. The information display apparatus according to claim 9, wherein the object in the imaged image existing in the target area at a changed position within the image is recognized.

13. An information display apparatus that superposes information on an image and displays the information and the image, the apparatus comprising:

at least one processor programmed to cause the apparatus:
(a) to detect a movement speed of the image relative to a target;
(b) to determine a first area located near a center of the image to be a location of a target area in a case in which the movement speed is equal to or less than a first threshold value, the location of the target area being shifted within the image based on a movement of the image;
(c) to recognize an object of one or more objects in the image;
(d) to preferentially superpose, in a case in which a number of the one or more objects existing in the image exceeds a threshold value, information related to the object being in the target area on the image, and to suppress superposition of the information related to the object being outside of the target area on the image; and
(e) to determine, in a case in which the number of the one or more objects existing in the image does not exceed the threshold value, the whole image to be the target area without using the detected movement speed, and to superpose the information related to the object recognizable in the whole image on the image.

14. The information display apparatus according to claim 13, wherein, in a case in which the movement speed exceeds the first threshold value, a second area that is narrower than the first area and located near the center of the image is determined to be the location of the target area.

15. An information display method that superposes information on an imaged image and displays the information and the imaged image, the method comprising:
detecting, with a sensor, a movement direction of the imaged image relative to an imaging target;
determining a location of a portion of a target area within the imaged image, based on the detected movement direction, the location of the portion of the target area being shifted within the imaged image based on the detected movement direction;
recognizing an object of one or more objects in the imaged image; and
superposing, on the imaged image, information related to an object when the object is in the target area, and not superposing, on the imaged image, the information related to an object when the object is outside of the target area,
wherein, in a case in which a percentage of the one or more objects existing in the imaged image does not exceed a threshold value:
(i) the whole imaged image is determined to be the target area without using the detected movement direction;
(ii) the one or more objects recognizable in the imaged image are recognized; and
(iii) the information related to the recognized one or more objects in the imaged image is superposed on the imaged image.

16. An information display method that superposes information on an imaged image and displays the information and the imaged image, the method comprising:
detecting, with a sensor, a movement direction of the imaged image relative to an imaging target;
determining a location of a portion of a target area within the imaged image, based on the detected movement direction, the location of the portion of the target area being shifted within the imaged image based on the detected movement direction;
recognizing an object of one or more objects in the imaged image;
preferentially superposing, in a case in which a number of the one or more objects existing in the imaged image exceeds a threshold value, information related to the object being in the target area on the image, and suppressing superposition of the information related to the object being outside of the target area on the imaged image; and
determining, in a case in which the number of the one or more objects existing in the imaged image does not exceed the threshold value, the whole imaged image to be the target area without using the detected movement direction, and superposing the information related to the object recognizable in the whole imaged image on the imaged image.

17. An information display method that superposes information on an image and displays the information and the image, the method comprising:
detecting a movement direction of the image relative to a target;
determining a location of a portion of a target area within the image, based on the detected movement direction, the location of the portion of the target area being shifted within the image in the detected movement direction;
recognizing an object of one or more objects in the image;
preferentially superposing, in a case in which a number of the one or more objects existing in the image exceeds a threshold value, information related to the object being in the target area on the image, and suppressing superposition of the information related to the object being outside of the target area on the image; and
determining, in a case in which the number of the one or more objects existing in the image does not exceed the threshold value, the whole image to be the target area without using the detected movement direction, and superposing the information related to the object recognizable in the whole image on the image.

18. An information display method that superposes information on an image and displays the information and the image, the method comprising:
detecting a movement speed of the image relative to a target;
determining a first area located near a center of the image to be a location of a target area in a case in which the movement speed is equal to or less than a first threshold value, wherein the location of the target area is shifted within the image based on a movement of the image;
recognizing an object of one or more objects in the image;
preferentially superposing, in a case in which a number of the one or more objects existing in the image exceeds a threshold value, information related to the object being in the target area on the image, and suppressing superposition of the information related to the object being outside of the target area on the image; and
determining, in a case in which the number of the one or more objects existing in the image does not exceed the threshold value, the whole image to be the target area without using the detected movement speed, and superposing the information related to the object recognizable in the whole image on the image.

19. A non-transitory computer-readable storage medium that stores a computer-executable program to achieve an information display method that superposes information on an imaged image and displays the information and the image, the method comprising:

detecting, with a sensor, a movement direction of the imaged image relative to an imaging target;

determining a location of a portion of a target area within the imaged image, based on the detected movement direction, the location of the portion of the target area being shifted within the imaged image based on the detected movement direction;

recognizing an object of one or more objects in the imaged image;

preferentially superposing, in a case in which a number of the one or more objects existing in the imaged image exceeds a threshold value, information related to the object being in the target area on the imaged image, and suppressing superposition of the information related to the object being outside of the target area on the imaged image; and determining, in a case in which the number of the one or more objects existing in the imaged image does not exceed the threshold value, the whole imaged image to be the target area without using the detected movement direction, and superposing the information related to the object recognizable in the whole imaged image on the imaged image.

\* \* \* \* \*